Feb. 12, 1952        A. C. NIELSEN        2,585,577
MEANS FOR DETACHABLY RETAINING MACHINE
ELEMENTS AND MECHANISMS
Filed Feb. 17, 1949
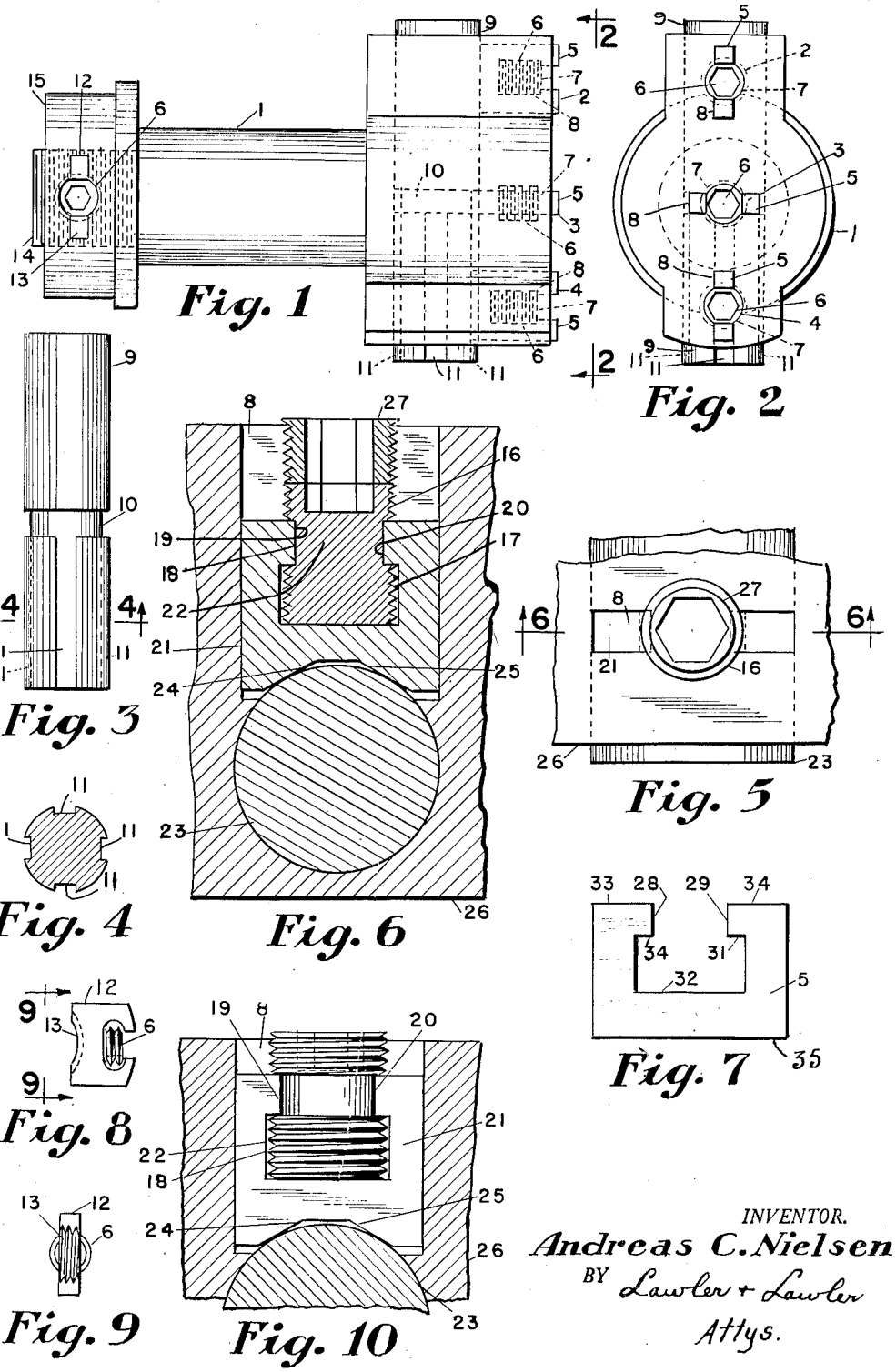
INVENTOR.
Andreas C. Nielsen
BY Lawler + Lawler
Attys.

Patented Feb. 12, 1952

2,585,577

UNITED STATES PATENT OFFICE 2,585,577

MEANS FOR DETACHABLY RETAINING MACHINE ELEMENTS AND MECHANISMS

Andreas C. Nielsen, East Cleveland, Ohio

Application February 17, 1949, Serial No. 77,075

3 Claims. (Cl. 85—1)

This invention relates to means for detachably retaining machine elements and mechanisms, such as couplings, clutches, tools and dies, etc., wherein keys are usually employed.

The selection of the most suitable type of keys is a problem of utmost importance. It is not sufficient to select a key suitable for the machine element or mechanism, but a proper account should be taken of the liability of such disturbing influences as vibration and shock; for these matters bear strongly upon the problem of type-selection and the successful operation of the machine element or mechanism year in and year out.

Variation from the ideal condition must be dealt with, by fully appreciating the particular suitability of the different types for different types of duty.

The means of this invention for detachably retaining the machine element or mechanism is so designed that when it is incorporated in a coupling, a pulley or a clutch, and in fact, in a machine element or mechanism where a key may be used, the shoe in which the socket set screw cooperates may be removed with ease and dispatch, and without injury to the machine element or the detachable retaining means.

The shoe element of the combination prevents the socket set screw from loosening with shock and jar, as for instance in stopping and starting, where the running of the driven shaft is slower than the driver for sometime before increasing to full speed.

It has been proven by its installation in a variety of machine elements and mechanisms, that it has prevented premature failure.

The shoe may be made of steel or may be surfaced hardened to resist distortion when tightened by the socket set screw wrench. The shoe is prevented from twisting by being let into a slot milled or otherwise provided therefor in the machine element as shown in the explanatory drawing. The shoe may be additionally locked by means of a socket set screw where the material of the element is ample to permit its use.

Referring to the accompanying explanatory drawing, given merely by way of example.

Figure 1 is a view, in side elevation of a conventional machine element embodying the invention.

Figure 2 is an end view of Figure 1 looking in the direction of arrows 2—2.

Figure 3 is a view, in side elevation of the conventional plug shown in Figures 1 and 2 apart from the machine element.

Figure 4 is a sectional view on line 4—4 in Figure 3.

Figure 5 is a fragmentary plan view of a conventional machine element on a larger scale to clearly illustrate the means for detachably retaining a shaft member, and the use of an additional socket set screw to lock the means in the bearing.

Figure 6 is a sectional view on line 6—6 in Figure 5 looking in the direction of the arrows.

Figure 7 is a view, in elevation on a larger scale of the shoe member alone to illustrate its construction.

Figure 8 is a side view of the shoe member and socket set screw shown at 12 in Figure 1 removed from the nut 15 on the machine element 1 showing the complementary thread 13 that makes contact with the thread 14 on the machine element.

Figure 9 is an end view of the shoe member and socket screw showing the same looking in the direction of arrows 9—9 in Figure 8.

Figure 10 is a cross section similar to Figure 6 showing the employment of only one socket set screw.

Similar numerals refer to similar parts throughout the several views.

Referring now to Figure 1 of the drawing, I show my invention for detachably retaining members in combination with a conventional machine element 1. The respective means 2, 3 and 4 are of like construction, and it is thought that a description of one will suffice for all.

The upper means 2 comprises a shoe member 5, of a configuration shown in the large view in Figure 7, and is provided with a socket set screw 6 that cooperates with the shoe member 5, and that screws into the threaded bore 7 in the machine element.

It will be noted that the shoe is let into a longitudinally extending slot 8 adapted to receive it with a snug sliding fit, and that the slot interrupts the thread in the threaded bore 7. The means just described shows the applicability of the combination, locking the plug 9 longitudinally in the machine element 1.

The means shown at 3 illustrates how the combination may be utilized to maintain the plug at a predetermined position in the machine element. It will be noted that the plug is provided with an annular groove 10 to accommodate the shoe so that when the socket set screw is set, the position of the plug is maintained in its lengthwise position in the machine element thereby.

The means shown at 4, illustrates how the combination may be used to maintain the plug by engaging a slot 11 provided therein.

The means 12 illustrates how the shoe may be provided with a complementary thread 13 to engage the thread 14 provided on the machine element 1, thereby locking the nut 15 in place thereon.

In Figure 6 there is illustrated a variant, wherein the socket set screw 16 is provided with an interrupted thread 17 to provide an annular race 18 so that the innermost ends 19 and 20 of the shoe 21 are in frictional contact with the reduced portion 22 of the socket set screw, see Figure 6 where this feature is illustrated. The lower end of the shoe may be made to engage the shaft 23 as shown at 24 and 25 in the machine element 26 shown fragmentary. An additional socket set screw 27 is shown locking the socket set screw 16 as a precaution against loosening.

The inner ends of the shoe 28 and 29, see Figure 7, are spaced apart a distance equal to the diameter of the hexagon wrench used to tighten and loosen the socket set screw in the machine element or mechanism, so that the wrench when inserted therebetween, its corners across its greatest diameter will be in touching relationship therewith but its entry into the socket set screw will not be restricted thereby.

The longitudinally extending slot 8 into which the shoe 5, 12 or 21 may be inserted prevents the shoe from twisting under the tightening action of the socket set screw.

The upper bearing surfaces for the socket set screw are shown at 30 and 31, while the lower bearing surface for same is shown at 32 in the shoe 5. The surface that makes contact with the machine element is shown at 35, see Figure 7. It will be noted that the inwardly extending symmetrically arranged portions 33 and 34 define an entrance for the wrench and that the upper bearing surfaces of the inwardly extending portions of the shoe overlie diametral portions of the socket set screw and provides a means to lift the shoe, thus facilitating its easy release from the longitudinally extending slot if necessary.

The wrenches used with the various sizes of socket set screws are of a standard predetermined well understood in the art.

Many constructional changes may, of course, be introduced in the embodiments described and illustrated by way of example, without departing from the scope of the invention.

I claim:

1. Means for detachably retaining a machine element, comprising, in combination, a machine element provided with a longitudinally extending through slot therein and having a threaded bore positioned therein and interrupting the length thereof, a thin metallic shoe member of rectangular configuration operatively associated with the longitudinally extending slot in the machine element and having an elongated rectangular opening therein adapted to receive a conventional socket set screw rotatably disposed within the elongated rectangular opening in the shoe member, a wrench opening in the top of the shoe member defined by inwardly symmetrically arranged portions and aligned with the rectangular opening in the shoe member, the aforementioned shoe member and conventional socket set screw mounted in longitudinally extending slot and threaded bore interrupting its length, the slot adapted to prevent rotation of the shoe member therein and the conventional socket set screw adapted to tighten the shoe member to retain the machine element by contact of the lower surface of the shoe member therewith.

2. Means for detachably retaining a machine element, comprising in combination, a machine element having a longitudinally extending through slot therein having within its length a through bore having confronting internally threaded segmental sections, a thin metallic shoe member of parallelogram configuration having an elongated rectangular shaped opening formed therein adapted to receive standardized socket set screw whose diameter is equal to the length of the elongated rectangular opening therein, and whose length is equal to the height thereof, the shoe member being further provided with a wrench entrance into the socket set screw defined by inwardly extending diametral portions of the shoe member which overlie conterminous portions of the socket set screw, the shoe member and the socket set screw mounted in the longitudinally extending slot and threaded bore within its length, the slot in the machine element adapted to prevent the turning of the shoe member therein, and the set screw adapted to tighten the threaded face of the shoe against the machine element to retain it.

3. Means for detachably retaining a machine element, comprising, in combination, a machine element having a longitudinally extending through slot therein and having within its length and spaced from the ends thereof a through threaded bore providing confronting threaded segmental sections, a thin metallic shoe member of U-shaped configuration slidably fitting said slot and having a transverse opening provided therein adapted to receive a threaded end portion of a socket set screw having a reduced cylindrical mid-portion, the shoe member being provided with confronting inwardly extending portions the ends of which engage said reduced cylindrical portion of the socket set screw, the thin metallic shoe member and the set screw mounted in the aforementioned slot and threaded bore, the slot adapted to prevent turning movement of the shoe member when the socket set screw is manipulated in tightening and loosening the shoe member in the machine element.

ANDREAS C. NIELSEN.

REFERENCES CITED

The following references are of record in the file of this patent:

UNITED STATES PATENTS

| Number | Name | Date |
| --- | --- | --- |
| 602,120 | Wright | Apr. 12, 1898 |
| 880,948 | Wilhelm et al. | Mar. 3, 1908 |
| 1,156,105 | Sleeper | Oct. 12, 1915 |
| 1,420,171 | Wille | June 20, 1922 |
| 1,523,932 | Davies | Jan. 20, 1925 |
| 1,882,167 | Thirlwell | Oct. 11, 1932 |
| 2,088,481 | Mylius | July 27, 1937 |
| 2,128,116 | Boone | Aug. 23, 1938 |